(12) United States Patent
Witte

(10) Patent No.: US 9,856,358 B2
(45) Date of Patent: Jan. 2, 2018

(54) PROCESS FOR THE PRODUCTION OF PRESS COMPOUNDS (BMC) FROM UNHARDENED PREPREG WASTES

(71) Applicant: Airbus Operations GmbH, Hamburg (DE)

(72) Inventor: Tassilo Witte, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/381,967

(22) Filed: Dec. 16, 2016

(65) Prior Publication Data

US 2017/0174860 A1    Jun. 22, 2017

(30) Foreign Application Priority Data

Dec. 18, 2015   (DE) ........................ 10 2015 122 308

(51) Int. Cl.
| | | |
|---|---|---|
| *C08K 9/00* | (2006.01) | |
| *C08J 11/06* | (2006.01) | |
| *C08K 7/06* | (2006.01) | |
| *C08K 7/14* | (2006.01) | |
| *C08K 3/22* | (2006.01) | |
| *B29B 17/00* | (2006.01) | |
| *B29C 70/00* | (2006.01) | |

(52) U.S. Cl.
CPC ............... *C08J 11/06* (2013.01); *B29B 17/00* (2013.01); *B29C 70/00* (2013.01); *C08K 3/22* (2013.01); *C08K 7/06* (2013.01); *C08K 7/14* (2013.01); *C08K 2003/222* (2013.01); *C08K 2003/2227* (2013.01)

(58) Field of Classification Search
CPC .... C08J 11/06; C08J 5/24; C08K 3/22; C08K 7/06; C08K 7/14
See application file for complete search history.

(56) References Cited

U.S. PATENT DOCUMENTS

| | | | | |
|---|---|---|---|---|
| 5,232,771 A | * | 8/1993 | Fadell | ................ B29C 45/0005 264/116 |
| 2003/0092554 A1 | * | 5/2003 | Wagh | ................... C04B 28/342 501/1 |
| 2016/0368255 A1 | * | 12/2016 | Witte | ................. B32B 37/0053 |

FOREIGN PATENT DOCUMENTS

DE    19514543    3/1996

OTHER PUBLICATIONS http://www.pierret.com/de/produits/coupeuses/.

* cited by examiner

*Primary Examiner* — Hannah Pak
(74) *Attorney, Agent, or Firm* — Greer, Burns & Crain, Ltd.

(57) ABSTRACT

A process for the recycling of wastes from webs or strands made of prepreg wastes comprising a first reactive resin, having the following steps: homogenization of prepreg wastes, dispersion of fillers and/or additives in a second reactive resin, mixing of the second resin, homogenized prepreg wastes and further processing of the mixture of resin, fillers and/or additives and prepreg wastes to produce molded workpieces.

13 Claims, 1 Drawing Sheet

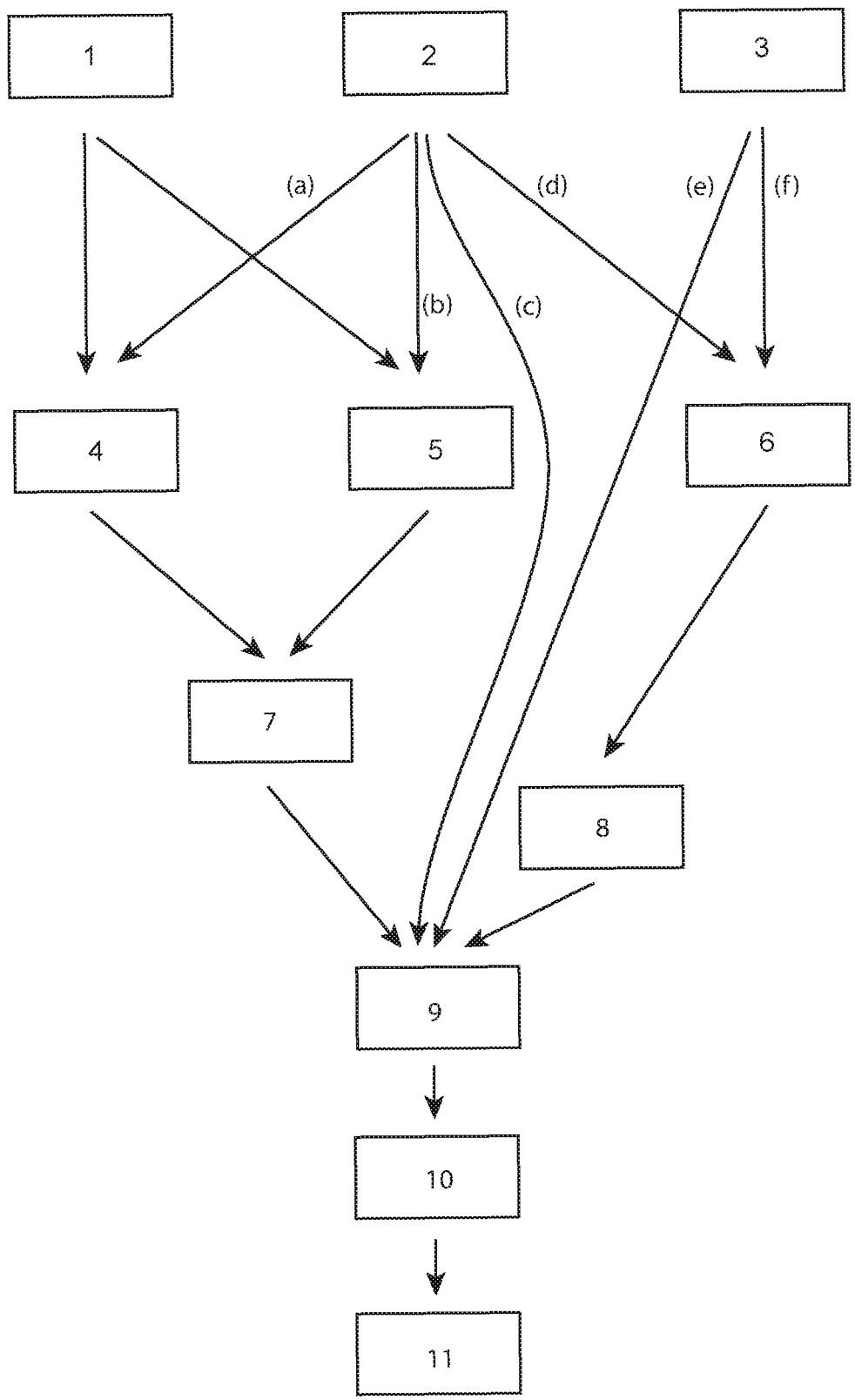

PROCESS FOR THE PRODUCTION OF PRESS COMPOUNDS (BMC) FROM UNHARDENED PREPREG WASTES

CROSS-REFERENCES TO RELATED APPLICATIONS

This application claims the benefit of the German patent application No. 102015122308.2 filed on Dec. 18, 2015, the entire disclosures of which are incorporated herein by way of reference.

BACKGROUND OF THE INVENTION

The invention relates to a process for the recycling of material comprising unhardened prepreg wastes to produce fiber-containing press compounds (BMC).

Prepregs are fiber products in sheet form or in strand form which comprise glass fibers or carbon fibers and which have been treated with reactive resin. Resin used can be epoxy resin. The epoxy resins used are formulated in such a way that they harden at a particular temperature. Epoxy resins used in aircraft construction mostly harden at 180° C.; curing temperatures of the epoxy resins used in other technical sectors are usually different, mostly being significantly lower. Because the reactive resin of the prepregs has limited shelf life, it can be necessary to cool prepregs during storage. After a particular period of exposure of these prepregs to higher temperatures (for example room temperature) they are subject to usage limitations, because the resin has already reacted to an unacceptable extent, and cures. It is naturally desirable that this material that has exceeded its shelf life is recycled. Carbon prepregs in particular are, moreover, very expensive.

Lay-up procedures, for example AFP processes or ATL processes (automated fiber placement, automated tape laying) moreover produce offcut material. On the prepreg rolls there can, moreover, be prepreg residues that cannot be used for lay-up (roll ends). The final cutting-to-size of a workpiece prior to hardening can also produce single- or multilayer wastes.

Fiber-containing press compounds are composed of short glass fibers or short carbon fibers and a matrix resin, and are known as bulk molding compounds (BMC). BMC can be processed in the hot-press process. For this, the BMC is inserted centrally into a heated, divided mold. Closure leads to distribution of the BMC within the mold cavity. BMC can also be processed by injection molding.

BMC can be composed of a mixture of from 10 to 35% of resin, from 10 to 50% of fibers and from 0 to 70% of fillers and/or additives.

Production of BMC from prepreg wastes can begin with removal of the resin, for example by pyrolysis. The resin-free fibers can then be comminuted and mixed with fresh resin, fillers and additives.

DE 19514543 C1 discloses a process for the reclamation and recycling of offcut material wastes from webs made of resin that is still reactive, where the offcut material wastes are chopped in a particular way, the viscosity of the resin is reduced by heating or addition of solvent, and mechanical shear stress is used to produce a mixture of separated fibers and resin which is then used as raw material for further processing.

SUMMARY OF THE INVENTION

It is an object of the present invention to recycle offcut wastes of prepreg material made of unhardened prepregs without first removing the resin. The person skilled in the art could not have anticipated what has now been found: that the disadvantages of the prior art are eliminated by a process for the recycling of wastes from webs or strands made of carbon fibers and/or glass fibers (prepreg wastes) respectively comprising reactive resin A, characterized by the following steps:

a) homogenization of webs or strands made of carbon fibers and/or glass fibers (prepreg wastes) respectively comprising reactive resin A, where the prepreg wastes are comminuted, b) dispersion of fillers and/or additives in reactive resin B, c) mixing of resin B, homogenized carbon fibers and/or glass fibers respectively comprising reactive resin A, and optionally of fillers and/or additives, where the reactive resins A and B are mutually compatible or identical, d) further processing of the mixture of resin, fillers and/or additives and prepreg wastes to produce molded workpieces. Prepreg wastes can thus be recycled to produce fiber-containing press compounds without any requirement for prior separation of the fibers from the resin. The process of the invention permits easy handling of the tacky prepreg wastes, processing of large quantities of the waste materials, and indeed in specific cases continuous recycling, and finally the re-use of these wastes as raw material.

For clarification, it should be noted that it is difficult to draw a clear distinction between the terms "fillers" and "additives." For the purposes of the invention, therefore, the term "fillers and/or additives" is used with the intention of encompassing all such additions without differentiating between fillers and additives. The fillers and/or additives can in particular be incorporated successfully into the resin B by using a disperser disc, and it is also advantageous here that the resultant mixture exhibits homogeneous dispersion of the fillers and/or additives, can be produced without agglomerates, and is heated to 70° C. via introduction of mechanical energy, with resultant improved flow properties. A particularly elegant homogenization method of the process of the invention uses an enclosed space in which conveying action and shear action, for example provided by a screw, allow both comminution and mixing of the prepreg wastes. The ratio by weight of resin B to prepreg wastes is preferably from 2:1 to 1:5, particularly preferably from 1:1 to 1:2. The ratio by weight of the entirety of fillers and/or additives to prepreg wastes is preferably from 2:1 to 1:5, particularly preferably from 1:1 to 1:2. Formulations that have proved successful comprise, in each case based on the compound, from 1/3 to 1/2 of prepreg wastes, from 1/3 to 1/4 of resin B and from 1/3 to 1/4 of the fillers and/or additives. It is moreover preferable that the homogenization of the prepreg wastes is achieved with a guillotine, screw-type extruder, twin-screw extruder, injection-molding machine, dicer, portal-controlled ultrasound cutter, rotary cutter or rolling crusher. In the case of unidirectional fibers, the guillotine here is oriented in such a way that its blade is in essence perpendicular to the fiber direction. In the case of multiaxial laid scrims, there can be a rotary cutter orthogonal to the guillotine, in order that fibers oriented in essence parallel to the guillotine blade are likewise comminuted. The guillotine can be of the type seen at (http://www.pierret.com/de/produits/coupeuses/) (a copy of which is filed herewith). If a screw-type extruder, twin-screw extruder or injection-molding machine is used, the following operating parameters must be selected and balanced with respect to one another in such a way that the shear forces arising in the composition made of resin A and fibers comminute the fibers to the desired dimensions: screw geometry, rotation rate and conveying length. When a dicer is used, the dimensions of the comminuted fibers can be determined very easily via the dimensions of the grid. A portal-controlled ultrasound cutter is usually part of an AFP system. In the AFP procedure the laid-up fibers are thus cut to the desired length dimension. The unwanted parts of the fibers beyond the desired length can likewise be chopped in a manner that makes them directly suitable for use in a process of the invention. This type of cutter can also be operated independently of an AFP system. Rotary cutters can be used in machinery, or else manually. Rolling crushers can be successful in comminuting the prepreg wastes when the wastes are brittle. Brittleness can generally be increased, and the comminution procedure can thus be facilitated, by using cooled prepreg wastes, for example by adding a coolant that evaporates to leave no residue (liquid nitrogen, dry ice) to the homogenization apparatus. This is not possible when extruders and injection-molding machines are used. Another possibility is prior cooling of the prepreg wastes to temperatures below −18° C. The fiber length is advantageously selected in such a way that the flow properties of the resultant product are appropriate for the component to be produced: longer fibers provide greater stability to a component; shorter fibers permit better flow of the press compound and thus production of geometries with greater complexity. It is preferable to comminute the prepreg wastes in such a way that the fiber length is at most 50 mm, preferably from 6 to 30 mm, particularly preferably from 10 to 24 mm; 95% of the fibers by mass here are intended to be within the stated range. When a screw-type extruder, twin-screw extruder or injection-molding machine is used, the scattering range can be controlled via the following operating parameters: screw geometry, rotation rate and conveying length. It is preferable that the fillers and/or additives comprise $CaCO_3$, preferably marble, talc powder, aluminum hydroxide or magnesium hydroxide, MgO, silica gel, pigments and/or silica. Aluminum hydroxide is also termed aluminum trihydrate, and has flame-retardant effect. Very particular preference is given to talc powder and aluminum trihydrate. It is moreover particularly preferable that a portion of the fillers and/or additives is added in step a). This reduces the tackiness of the prepreg wastes that have been homogenized and are to be homogenized. It is preferable that 10% of all of the fillers and/or additives to be added are added in step a). It is moreover particularly preferable that the steps a) to d) are carried out in their alphabetic sequence. It is moreover particularly preferable that the chronological separation between step c) and d) is at most 2 months. The shelf life of the reBMC product of the invention at −18° C. is up to 2 months. It is moreover particularly preferable that step c) takes place at a temperature of at most 80° C., preferably at most 60° C. This avoids any significant hardening of the resin, because that requires at least 160° C. and is usually achieved at 180° C. If the process of the invention is intended for prepreg wastes which cure at lower temperatures, a temperature sufficiently different from this temperature must be maintained during the steps a), b) and c) which involve thermal stress. It is moreover particularly preferable that step c) is carried out in a screw-type kneader, sigma kneader, wing kneader or high-speed mixer. The mixing procedure is usually carried out batchwise for from 5 to 15 minutes, preferably from 10 to 15 minutes. There are known continuous compounding processes for the production of BMC, and these can likewise be used for the purposes of the process of the invention. It is moreover particularly preferable that step e) takes place in the hot-press process or injection-molding process.

BRIEF DESCRIPTION OF THE DRAWINGS

The FIGURE shows a process flow diagram of the method of the invention with process variants.

DETAILED DESCRIPTION OF THE PREFERRED EMBODIMENTS

The prepreg waste (1) collected must comprise as yet unhardened matrix resin. Materials that can be used are prepreg strips, mats, sections, and residues, which may be unidirectional or woven fabrics, single-ply or multiple-ply. Other requirements are fillers and/or additives (2) and resin B (3).

The prepreg waste is subjected to a homogenization step: homogenization is achieved either by cutting (4) or by shearing (5). In the case of homogenization by cutting (4), the prepreg waste is comminuted to produce strips or small fragments. A guillotine or a dicer can be used to achieve this. Another possible pretreatment method is homogenization by shearing (5). In the case of homogenization by shearing (5) the prepreg waste is, by way of example, extruded in a screw-type extruder or twin-screw extruder. The temperature here is set in such a way that no hardening of the matrix resin occurs. The resultant homogenized prepreg waste (7) can comprise short fibers of length from 5 to 20 mm, randomly orientated.

Resin B (3) and fillers and/or additives (2) can be introduced into the process in various ways. One possible method introduces resin B (3) and fillers and/or additives (2) into a mixing apparatus (d), (f) and disperses (6) the fillers and/or additives (2) in the resin B (3). A disperser disc or a dissolver can be used to achieve this. This produces the dispersion of resin B with fillers and/or additives (8). A second possible method introduces resin B (3) and fillers and/or additives (2) into a mixing apparatus (c), (e) into which the homogenized prepreg waste (7) is also introduced. In variants of both processes, a portion of the fillers and/or additives (2) is introduced into the apparatus (a) in which homogenization is achieved by cutting (4), or a portion of the fillers and/or additives (2) is introduced into the apparatus (b) in which homogenization is achieved by shearing (5).

Resin (3), fillers and/or additives (2), and also the homogenized prepreg waste (4) are fed into a mixing apparatus (9). As described, it is possible either to feed all three components directly or to add a dispersion (8) of fillers and/or additives (2) in resin (3). A particularly suitable mixing apparatus (9) is a twin-screw kneader. The nature of the resin must be such that it is compatible with the matrix of the prepreg waste. In particular, it is amenable to homogeneous mixing therewith and to successful hardening. Hexply M21E epoxy-resin-containing carbon prepregs from the company Hexcel, as used in aircraft construction, are by way of example compatible with the resins RTM6, M21 and DLS1791 which are likewise marketed by the company Hexcel. Additional resin is required to fill cavities in the randomly oriented fibers; these additional cavities can be attributable to the fact that the randomly oriented fibers comprise more cavities or require more space, and therefore absorb more resin than unidirectionally orientated fibers.

Particular fillers and/or additives (2) that can be used are flow improvers, for example $CaCO_3$ (chalk or marble), preferably with particle size from 5 to 50 micrometers, and/or magnesium hydroxide or aluminum hydroxide, silica or silica gel; it is moreover possible to use release agents, pigments, stabilizers, catalysts and/or inhibitors.

Quantities that can be used, based on the final BMC products, are from 40 to 70% by weight of prepreg wastes, from 10 to 50% by weight of resin, from 10 to 30% by weight of flow improvers, up to 5% by weight of release agents, up to 10% by weight of pigments and/or up to 10% by weight of catalysts and/or inhibitors.

It can be advantageous to begin by charging resin (3) or resin dispersion (8) to the mixing apparatus (9), optionally mixing this with fillers and/or additives (2), and only then adding the homogenized prepreg wastes (7). The mixture is re-homogenized in the mixing apparatus (9), and after from 5 to 15 minutes recycled BMC (10) (reBMC) is obtained as intermediate product. This can then be further processed in the hot-press process (11) to produce workpieces.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

KEY (1) Prepreg waste
(2) Fillers and/or additives
(3) Resin B
(4) Homogenization by cutting
(5) Homogenization by shearing
(6) Dispersion
(7) Homogenized prepreg waste
(8) Dispersion made of resin B with fillers and/or additives
(9) Mixing apparatus
(10) Recycled BMC
(11) Further processing
(a) Addition during homogenization by cutting
(b) Addition during homogenization by shearing
(c) Addition to the mixing apparatus
(d) Addition with dispersion

EXAMPLES

Example 1: Production of reBMC with an Extruder 500 kg of residues of offcut Hexcel Hexply M21E prepreg materials—comprising only resin and fiber—with no separating film or other foreign substances are charged to an extruder, which can be a single-screw or twin-screw extruder as desired.

The material is comminuted in the extruder at about 70 rpm on a conveying screw (not a plastifying screw) with length about 1 m, L/D ratio >30 and maximal temperature 70° C.

The prepreg is charged at the ingoing end of the screw; the following are added by way of another addition slot at about 1/3 of the length: Hexcel RTM6 resin (200 kg) and further fillers, e.g. Nabaltec Apyral 40 or Magnesia 7287 (300 kg).

The remaining 2/3 of the screw length serves for mixing of the compound and homogenization of fiber length.

The material is discharged at the outgoing end of the extruder.

Finally, the material is consolidated in a press procedure in a heatable vertical press (platen press) in a divided mold (upper mold and lower mold) (cf. SMC/BMC) to produce the final component (press pressure from 120 to 140 bar, temperature 180° until material can be demolded).

Example 2: Production of reBMC with Cutter and Kneader 500 kg of residues of offcut Hexcel Hexply M21E prepreg materials, without separating film or other foreign substances, are processed in a guillotine cutter, for example an N45 from the manufacturer Pierret, to produce a generally uniform fiber length: fiber length from 12 to 24 mm. For single-ply prepreg (e.g., roll residues) it is preferable to use a cutter.

Hexcel RTM6 resin component and Nabaltec Apyral 40 or Magnesia 7287 fillers are then mixed in a Niemann Kreis-Dissolver (200 kg of resin and by way of example 300 kg of further fillers). The mixing of resin and fillers can also alternatively be achieved directly in the kneader, but the quality of the mixture is then poorer.

Premixed resin and cut prepreg are charged to a sigma kneader and mixed at from 60 to 100 rpm for about 10 min.

Finally, the material is consolidated in a press procedure in a heatable vertical press (platen press) in a divided mold (upper mold and lower mold) (cf. SMC/BMC) to produce the final component (press pressure from 120 to 140 bar, temperature 180° until material can be demolded).

Example 3: Production of reBMC with Extruder and Kneader 500 kg of residues of offcut Hexcel Hexply M21E prepreg materials, without separating film or other foreign materials, are charged to an extruder, which can be a single-screw or twin-screw extruder, as desired, and are processed therein at about 70 rpm and at most 70° C. to produce a generally uniform fiber length (stochastical fiber length distribution around a value defined via these process parameters).

Hexcel RTM6 resin component and Nabaltec Apyral 40 or Magnesia 7287 fillers are then mixed in a dissolver (for example Niemann Kreis-Dissolver) (200 kg of resin and by way of example 300 kg of further fillers). The mixing of resin and fillers can also alternatively be achieved directly in the kneader, but the quality of the mixture is then poorer.

Premixed resin and cut prepreg are charged to a sigma kneader, for example K II 450 from the manufacturer Linden, and mixed at from 60 to 100 rpm for about 10 min.

Finally, the material is consolidated in a press procedure in a heatable vertical press (platen press) in a divided mold (upper mold and lower mold) (cf. SMC/BMC) to produce the final component (press pressure from 120 to 140 bar, temperature 180° until material can be demolded).

The invention claimed is:

1. A process for recycling of prepreg wastes comprising reactive resins and making molded workpieces, the process comprising the following steps:
   a) homogenizing prepreg wastes comprising webs or strands made of at least one of carbon fibers or glass fibers including a first reactive resin A, wherein the prepreg wastes are comminuted,
   b) dispersing at least one fillers or additives in a second reactive resin B,
   c) mixing the homogenized prepreg wastes with the second reactive resin B, wherein the first and second reactive resins A and B are mutually compatible or identical, and
   d) further processing the mixture of the second reactive resin B, fillers or additives, and homogenized prepreg wastes to produce molded workpieces.

2. The process according to claim 1, wherein a ratio by weight of the second reactive resin B to prepreg wastes is from 2:1 to 1:5.

3. The process according to claim 1, wherein the chronological separation between step c) and d) is at most 2 months.

4. The process according to claim 1, wherein the homogenization of the prepreg wastes is achieved with one of a guillotine, screw extruder, twin-screw extruder, injection-molding machine, dicer, portal-controlled ultrasound cutter, rotary cutter or rolling crusher.

5. The process according to claim 1, wherein the prepreg wastes are comminuted in a manner such that the prepreg wasters have a fiber length that is at most 50 mm.

6. The process according to claim 1, wherein the fillers and/or additives comprise at least one $CaCO_3$, talc powder, aluminum hydroxide or magnesium hydroxide, MgO talc powder, silica gel, pigments or silica.

7. The process according to any of the preceding claims, further comprising:
   adding fillers and/or additives in step a).

8. The process according to claim 1, wherein the steps a) to d) take place in their alphabetic sequence.

9. The process according to claim 1, wherein step c) is carried out in one of a screw kneader, sigma kneader, wing kneader or high-speed mixer.

10. The process according to claim 1, wherein step d) takes place in one of the hot-press process or injection-molding process.

11. The process according to claim 1, wherein a ratio by weight of the fillers and/or additives to prepreg wastes is from 2:1 to 1:5.

12. The process according to claim 1, wherein the fillers and/or additives comprise at least one of $CaCO_3$, talc powder, aluminum hydroxide or magnesium hydroxide, MgO talc powder, silica gel, pigments or silica.

13. The process according to claim 1, wherein the dispersing of the fillers and/or additives with the second reactive resin B takes place at a temperature of at most 70° C.

* * * * *